US008458357B2

(12) United States Patent
Menchaca et al.

(10) Patent No.: US 8,458,357 B2
(45) Date of Patent: Jun. 4, 2013

(54) TECHNIQUE FOR SETTING NETWORK COMMUNICATION PARAMETERS

(75) Inventors: Benjamin Menchaca, Pflugerville, TX (US); Harlan T. Beverly, McDade, TX (US); Christopher Cowden, Austin, TX (US); Charles Musta, Austin, TX (US); Wayne Dunlap, Austin, TX (US)

(73) Assignee: Qualcomm Incorporated, San Diego, CA (US)

(*) Notice: Subject to any disclaimer, the term of this patent is extended or adjusted under 35 U.S.C. 154(b) by 99 days.

(21) Appl. No.: 12/825,501

(22) Filed: Jun. 29, 2010

(65) Prior Publication Data

US 2010/0332667 A1 Dec. 30, 2010

Related U.S. Application Data

(60) Provisional application No. 61/221,147, filed on Jun. 29, 2009.

(51) Int. Cl.
*G06F 15/16* (2006.01)
*G06F 15/173* (2006.01)

(52) U.S. Cl.
USPC .......................... 709/232; 709/224; 709/229

(58) Field of Classification Search
USPC .................. 709/224, 225, 228, 229, 232, 236
See application file for complete search history.

(56) References Cited

U.S. PATENT DOCUMENTS

| 6,574,195 | B2 * | 6/2003 | Roberts ................... 370/235 |
| 6,836,483 | B1 * | 12/2004 | Lee ...................... 370/395.31 |
| 6,957,071 | B1 * | 10/2005 | Holur et al. ............. 455/452.2 |
| 7,145,871 | B2 | 12/2006 | Levy et al. |
| 7,990,978 | B1 | 8/2011 | Chamas et al. |
| 2002/0198924 | A1 * | 12/2002 | Akashi et al. .............. 709/102 |
| 2003/0028626 | A1 * | 2/2003 | Hennessey et al. ........ 709/220 |
| 2004/0042410 | A1 * | 3/2004 | Harris et al. .............. 370/252 |
| 2005/0025176 | A1 * | 2/2005 | Ko et al. .................. 370/448 |
| 2006/0153127 | A1 | 7/2006 | Lee |
| 2008/0043638 | A1 * | 2/2008 | Ribiere et al. ............. 370/254 |
| 2010/0031157 | A1 | 2/2010 | Neer et al. |
| 2010/0121964 | A1 * | 5/2010 | Rowles et al. ............. 709/229 |
| 2010/0177673 | A1 * | 7/2010 | Yoon ........................ 370/311 |
| 2010/0333028 | A1 | 12/2010 | Welsh et al. |

FOREIGN PATENT DOCUMENTS

| KR | 100438713 | 7/2004 |
| KR | 100649297 B1 | 11/2006 |
| KR | 100825507 B1 | 4/2008 |
| KR | 20090042644 | 4/2009 |

OTHER PUBLICATIONS

Ramani et al, "SyncScan: practical fast handoff for 802.11 infrastructure networks", Mar. 2005, INFOCOM 2005, IEEE.*
International Search Report for PCT/US2010/040298 dated Jan. 28, 2011, 13 pages.
Written Opinion—PCT/US2010/040298, International Search Authority, European Patent Office, Jan. 28, 2011, 7 pages.
U.S. Appl. No. 12/825,506 Office Action, Apr. 19, 2012, 19 pages.
U.S. Appl. No. 12/825,506 Final Office Action, Dec. 7, 2012, 25 pages.

* cited by examiner

*Primary Examiner* — Brian J Gillis
(74) *Attorney, Agent, or Firm* — DeLizio Gilliam, PLLC

(57) ABSTRACT

Techniques are disclosed for setting network communication parameters at a network interface based on the types of applications being executed at one or more computer devices that interface with the network. Thus, for example, the network interface can set the communication bandwidth, priority, or combination thereof, for each executing application based on the application type. By setting the network communication parameters for each application based on the application type, the applications can communicate with the network more efficiently.

23 Claims, 6 Drawing Sheets

TECHNIQUE FOR SETTING NETWORK COMMUNICATION PARAMETERS

CROSS-REFERENCE TO RELATED APPLICATION

This application claims priority to U.S. Provisional Patent Application No. 61/221,147, entitled "Application Aware Bandwidth Control" filed on Jun. 29, 2009, which is assigned to the current assignee hereof and is incorporated herein by reference in it's entirety.

BACKGROUND

1. Field of the Disclosure

The present disclosure relates to computer networks and more particularly to setting network communication parameters for a computer network.

2. Description of the Related Art

Communication networks are employed to transfer a wide variety of information between electronic devices. However, as the amount of information transferred over a communication network increases, the communication backbone that governs the network can become stressed, causing undesirable delays in information transfer. This can result in a poor user experience. For example the user can experience network lag, where packets are held at a network node while awaiting transfer to another network node, for an amount of time such that the user is able to perceive the delay in the information transfer. Further, network lag and other network transfer problems can impact a wide variety of applications, such as gaming applications, voice communication applications, and the like.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate techniques for setting network communication parameters at a network interface based on the types of applications being executed at one or more computer devices that interface with the network. Thus, for example, the network interface can set the communication bandwidth, priority, or combination thereof, for each executing application based on the application type. By setting the network communication parameters for each application based on the application type, the applications can communicate with the network more efficiently. For example, an application that requires more bandwidth but can execute satisfactorily with relatively high latency can more efficiently use bandwidth by coalescing packets, using jumbo frames, and the like, whereas another application that requires relatively low bandwidth and low latency, such as an online game, can be less efficient with bandwidth in order to communicate information to a network more quickly. Both applications thereby communicate with the network more efficiently, reducing network problems, such as lag.

In another embodiment, the network parameters for a wireless network interface can be set based on the types of applications that are being executed at a computer device associated with the interface. Examples of wireless network parameters that can be adjusted include network access point scanning frequency, network acknowledgment frequency, setting a quality of service (QOS) field in wireless packets communicated to the wireless network, network channel scanning frequency, and the like. Thus, for example, if the network interface determines that a game application is being executed at a computer device, the network interface can determine the computer device is likely to be stationary, and therefore reduce the frequency at which the interface scans for new access points to the network. The network interface thereby reduces communication overhead and improves communication efficiency with the network.

Figure 1:
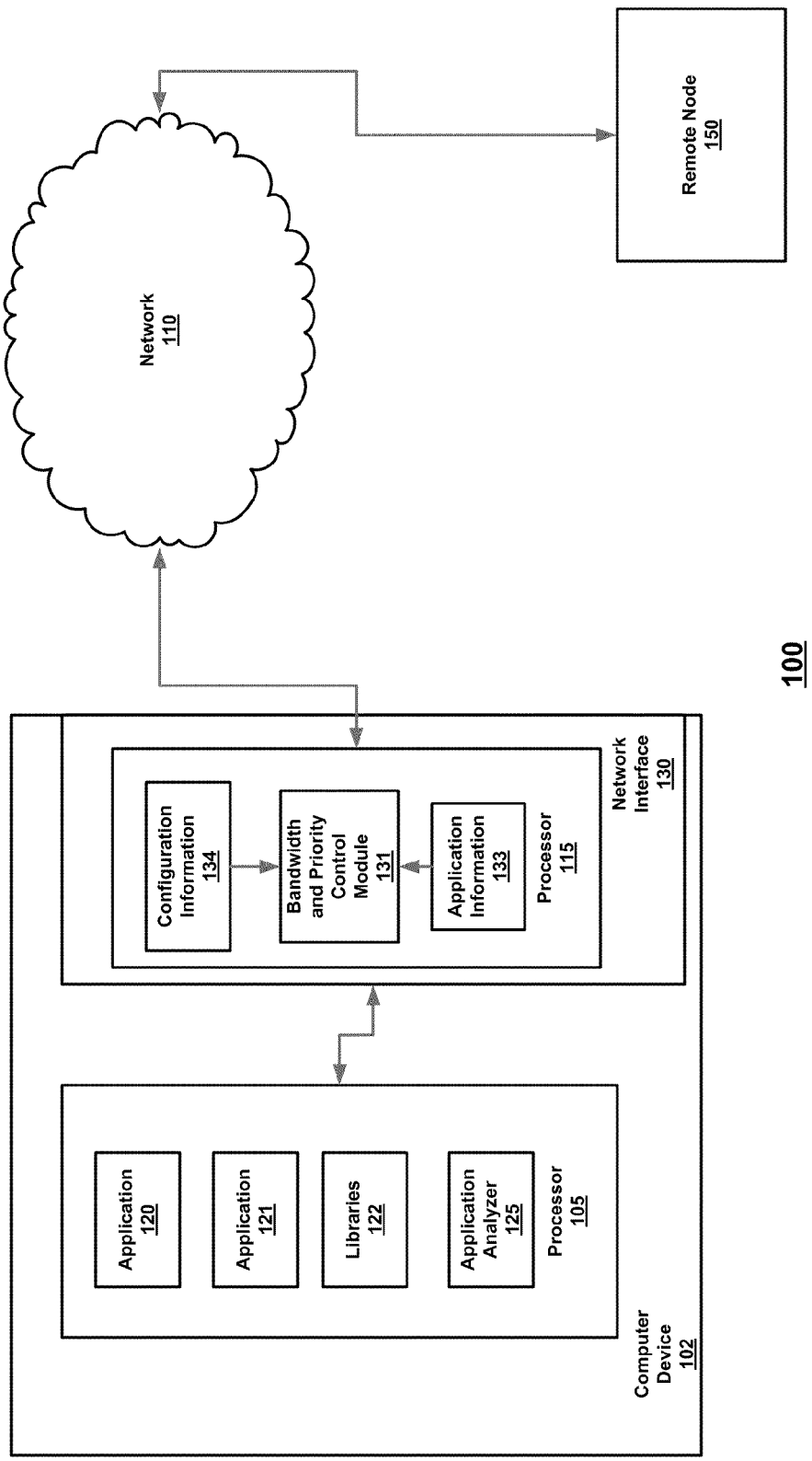
FIG. 1 is a block diagram of a communication system in accordance with one embodiment of the present disclosure.

Referring to FIG. 1, a block diagram of a communication system 100 is illustrated in accordance with one embodiment of the present disclosure. The communication system 100 includes a computer device 102, a network 110, and a remote node 150. The computer device 102 and remote node 150 are each coupled to the network 110. Network 110 provides a physical and logical layer for communication of information between the computer device 102 and remote node 150. Accordingly, the network 110 can be a packet-switched network that is configured to communicate packets between network nodes according to address information included in each packet. The network 110 is thus composed of multiple nodes, with a subset of the nodes having routing devices, such as routers, servers, gateways, and combinations thereof, that are configured to route packets to other nodes according to their associated address information. Packets are thereby routed to a series of nodes until they reach their destination node.

It will be appreciated that network 110 can include one or more sub-networks, and that each sub-network can be a wide area network, such as the Internet, a local area network, and the like. Packets are routed between the sub-networks according to the address information associated with each packet. In addition, it will be appreciated that different sub-networks can use different communication media to transfer information. For example, network 110 can include both wireless and wired networks, and combinations thereof.

Remote node 150 is a network node that is a source and destination for packets to be communicated via the network 110. Accordingly, remote node 150 can be a server in a client-server configuration, a computer device configured in a peer-to-peer network, and the like. Remote node 150 is thus configured to execute one or more applications that provide information to and receive information from the network 110 in order to carry out their designated function.

Computer device 102 is a desktop, laptop, server, handheld computer device, cell phone, or other device that is configured to communicate with remote nodes via the network 110. Accordingly, computer device 102 includes a processor 105 and a network interface 130. The processor 105 is a general purpose or application specific processor device that is configured to execute applications and other programs in order to carry out the programs designated functions. In the illustrated example of FIG. 1, processor 105 executes applications 120 and 121, libraries 122, and application analyzer 125, each described further below.

The network interface 130 is a device, such as a network interface card, that provides a physical and logical layer interface for communications from the processor 105 to the network 110. Accordingly, the network interface 130 includes a processor 115 that executes a number of programs, including a bandwidth and priority control module 131. In addition, the network interface 130 stores application information 133 and configuration information 134, which are used by the bandwidth and priority control module 131 to set the bandwidth and priority assigned to each application executing at the processor 105. As used herein, the bandwidth assigned to an application refers to the rate at which bytes are provided to or received from one or more remote nodes. In particular, the rate at which bytes are received from remote nodes is referred to as the download bandwidth, while the rates at which bytes are provided to the remote nodes is referred to as the upload bandwidth. The priority associated with an application refers to the order and manner, relative to other applications, in which bytes provided by the application or targeted to the application are provided to the network or to the application, respectively. In particular, the upload priority refers to the relative order and manner in which bytes provided by the application are communicated to the network 110, while the download priority refers to the relative order and manner in which bytes received from the network 110 and targeted to the application are provided to the application.

The network interface 130 can govern the bandwidth and priority for each application in order to ensure that the bandwidth and priority assigned to each application is satisfied. For example, the network interface 130 can include an upload buffer (not shown) to store bytes received from applications to be provided to the network 110 and a download buffer (not shown) to store bytes received from the network 110. The order and rate at which the network interface 130 retrieves bytes from the associated buffer, the manner in which it packetizes the retrieved bytes and provides the resulting packets to the network (for upload packets), and the order in which it provides bytes to an application (for download packets) determines the priority and bandwidth for the application. Thus, the network interface 130 can retrieve the bytes from each buffer in an order and at a rate to satisfy the bandwidth and priority assigned to each application. This can be better understood with reference to an example, where application 120 is assigned a relatively high upload bandwidth with respect to application 121 and a relatively low upload priority with respect to application 121. Accordingly, the network interface 130 will, for a designated unit of time (referred to as a communication interval), retrieve bytes associated with the application 121 from the upload buffer prior to retrieving bytes associated with the application 120, until the upload bandwidth limit associated with the application 121 is reached. Upon reaching the upload bandwidth limit, the network interface 130 stops retrieving packets for application 121 for the designated period of time, and retrieves packets associated with application 120 until the bandwidth limit for application 120 is reached. The network interface 130 then repeats the retrieval process over successive communication intervals in order to enforce the priority and bandwidth associated with each application. In another embodiment, the network interface 130, upon communicating all pending information for application 121, can wait a fixed or programmable period of time before communicating bytes associated with application 120 to the network. The network interface 130 thereby determines if application 121 has more data to send.

In another embodiment, the network interface 130 can determine, based on the priority associated with an application, a payload size for packets associated with that application. Thus, for example, the network interface 130 can determine that, the lower the priority of an application, the more bytes received from the application that can be included in each packet. Accordingly, to form a packet for a particular application, the network interface 130 can retrieve bytes from the upload buffer until the designated payload size for the application is reached and form the packet having the retrieved bytes as a payload. In an embodiment, during each communication interval, the network interface 130 determines a payload size for each application based on the corresponding priority for the application. In priority order, the network interface 130 forms packets for each application based on the packet size determined for that application. Once the bandwidth limit for an application has been reached, or if there is no more information to send for a particular application, the network interface 130 proceeds to the next-lower priority application. The process is repeated for each communication interval.

The network interface 130 is configured to determine the priority and bandwidth for each application based on the application type. In particular, application analyzer 125 is a module configured to determine the names of applications that are executing at processor 105. For example, the application analyzer 125 can determine the application names by accessing process information, task information, or other information provided by an operating system executing at the processor 105. The application analyzer 125 can also determine what software libraries, such as libraries 122, device drivers, operating system resources, or other routines, programs, and resources that are being accessed by each application. The application analyzer 125 provides the information that indicates the application type, such as the application name, accessed libraries and other resources, and the like, to the network interface 130 as application information 133.

The bandwidth and priority control module 131 determines the bandwidth and priority for each application based on the application information 133 and configuration information 134. Configuration information 134 is programmable or fixed information, or a combination thereof, that indicates the probability that an application is of a particular type based on information associated with that application. Thus, configuration information 134 can include a list of application names and the application type associated with that application. For example, the configuration information 134 can indicate that an application with a particular name is an online game application. The configuration information 134 can also indicate the probability that an application is a particular type of application based on the libraries and other resources, or combination thereof, accessed by an application. For example, the configuration information 134 can indicate that an application that accesses a particular set of libraries, device drivers, and other resources is likely to be a video streaming application.

In addition, the configuration information 134 can indicate the amount of bandwidth and level of priority to be assigned to each application of a particular type. For example, the configuration information 134 can indicate that an application that is expected to receive a lot of video information over the network 110, such as a video streaming application, is to be assigned a relatively high download bandwidth and relatively low download priority. In contrast, the configuration information 134 can indicate that an application that is not expected to receive a lot of information but for which low communication latency is desired, such as a text chat program, is to be assigned a relatively low download and upload bandwidth and a relatively high upload and download priority.

The configuration information 134 can be adjusted by a user via a graphical user interface or other interface program. The user can thereby adjust the priority and bandwidth assigned to programs of different types, as well as adjust the information that indicates a program is of a designated type. Thus, for example, the user can indicate that the name of a recently installed program indicates the program is of a particular type, and also adjust the relative priority and bandwidth assigned to the application type. In an embodiment, the user can adjust the relative upload and download priority individually, as well as adjust the relative upload and download bandwidth individually. Thus, the user can indicate that a particular program type is assigned a relatively high upload priority, a relatively low download priority, a relatively low upload bandwidth, and a relatively high download bandwidth, or any other combination.

The bandwidth and priority control module compares the application information 133 with the configuration information 134 to determine the application types associated with applications 120 and 121 respectively, and assigns the priorities and bandwidths for each application based on the determined types. In an embodiment, the configuration information 134 includes a digital file that stores a plurality of available application types, such as a network game program, a text chat program, a video chat program, a video streaming program, and the like. The bandwidth and priority control module 131 selects an application type for each from the plurality of available types based on the application information 133 associated with each application. In response, the network interface 130 manages the communication for each application based on the application type selected for the corresponding application. It will be appreciated that the bandwidth and priority control module 131 selects the application type, and determines the associated priority and bandwidth, automatically based on the dynamic application information provided by the processor 105, rather than relying only on a static indication from the application of the amount of bandwidth and priority desired by the application. This allows the network interface 130 to flexibly assign the bandwidth and priority for each executing application, without demanding that the user configure each program to request the appropriate priority or bandwidth level. For example, the network interface 130 can dynamically determine that an application is of a particular type based on the libraries or other resources accessed by the application, and assign the bandwidth and priority based on the type, even if the program name is not designated as a particular application type, or even if the program itself does not request a particular priority or bandwidth. Moreover, even if a program requests a particular bandwidth or priority level, the network interface 130 can override the request and assign the bandwidth and priority based on the type of application indicated by the configuration information 134.

In one embodiment, the network interface 130 can determine, based on the application type, that one or more bytes provided by an application for communication to the network 110 can be omitted from communication. For example, for a game application, the application can provide periodic positional updates for a player character in the game world, along with other similar periodic update information. Because these positional updates are expected to be provided by the game application frequently, periodically declining to communicate a positional update to the network 110 may not impact the user's game experience. Accordingly, in response to determining that an application is a game application, the network interface 130 can periodically remove one or more bytes provided by the game application from the upload buffer without communicating the one or more bytes to the network 110. Similarly, the network interface 130, for designated types of applications, periodically remove bytes from the download buffer without communicating the bytes to the target application associated with those bytes. The network interface 130 can thereby improve communication efficiency for designated types of applications without adversely impacting the user experience.

Figure 2:
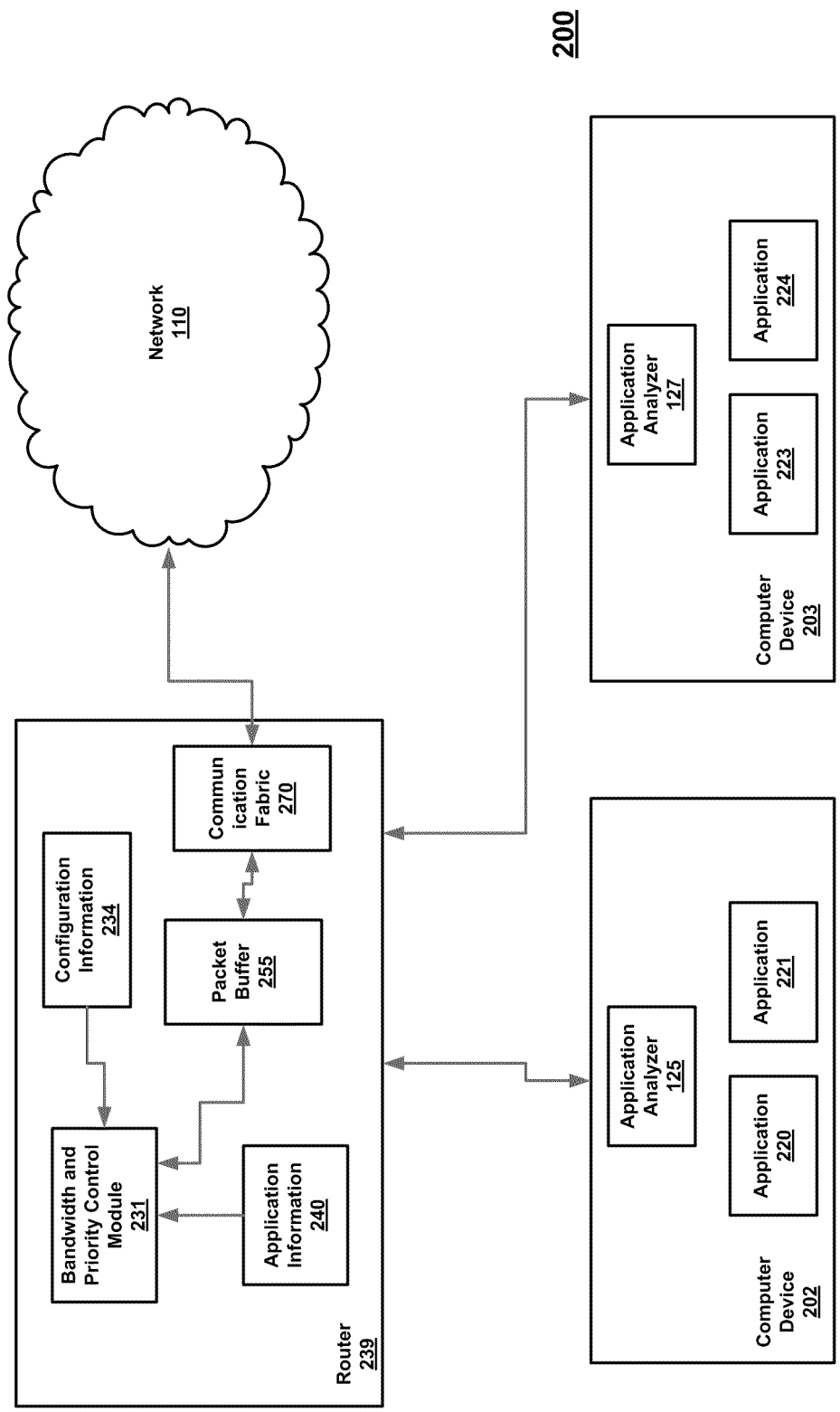
FIG. 2 is a block diagram of a communication system in accordance with another embodiment of the present disclosure.

Referring to FIG. 2, a block diagram of a communication network 200 in accordance with one embodiment of the present disclosure. Communication network 200 includes the network 110, computer devices 202 and 203, and a router 239. The router 239 is connected to both of the computer devices 202 and 203 and the network 110. Each of the computer devices 202 and 203 is configured similarly to the computer device 102 of FIG. 1, in that each executes applications that communicate with remote nodes (not shown) via the network 110. Thus, for example, computer device 202 executes applications 220 and 221, while computer device 203 executes applications 223 and 224. The computer devices 202 and 203 each also include an application analyzer (application analyzer 125 and application analyzer 127, respectively) that are each configured similarly to application analyzer 125 of FIG. 1 to determine application information associated with the applications executing at the respective computer device.

The router 239 is a device configured to receive packets and route each packet to other nodes based on address information indicated by the packet. In the illustrated embodiment, the router 239 provides an interface between the network 110 and the computer devices 202 and 203. In particular, the router 239 routes packets received from the computer devices 202 and 203 to destination remote nodes via the network 110 and also routes packets received from the network 110 to one or both of the computer devices 202 and 203, based on address information associated with each corresponding received packet.

The router 239 includes a bandwidth and priority control module 231, configuration information 234, and application information 240, each configured similarly to the corresponding modules of FIG. 1. Further, the router 239 includes a packet buffer 255 and a communication fabric 270. The communication fabric 270 provides a physical interface, such as a switching fabric, that allows the router 239 to route received packets to the appropriate destination. The packet buffer 255 stores received packets, including packets received from either of the computer devices 202 and 203 and the network 110. The bandwidth and priority control module 231 provides packets from the packet buffer 255 to the communication fabric 270 for routing based on the bandwidth and priority associated with the type of each application executing at the computer devices 202 and 203. The router 239 thereby provides for controlling the bandwidth and priority of packet communication based on application type, in similar fashion to the network interface 130 of FIG. 1. However, the router 239 is able to assign the bandwidth and priority for both of the computer devices 202 and 203. Thus, for example, application 220 can be assigned more bandwidth and a higher priority at router 239, based on its application type, than is assigned to application 223, based on its application type. By allowing the router 239 to control the bandwidth and priority for applications at different computing devices based on the application type, overall network efficiency can be improved. For example, the router 239 can prioritize a low-latency application at one computer device over a high latency application at another computer device, by identifying the application type associated with each application. The router 239 thereby enhances the communication efficiency for all computer devices connected to the router.

Figure 3:
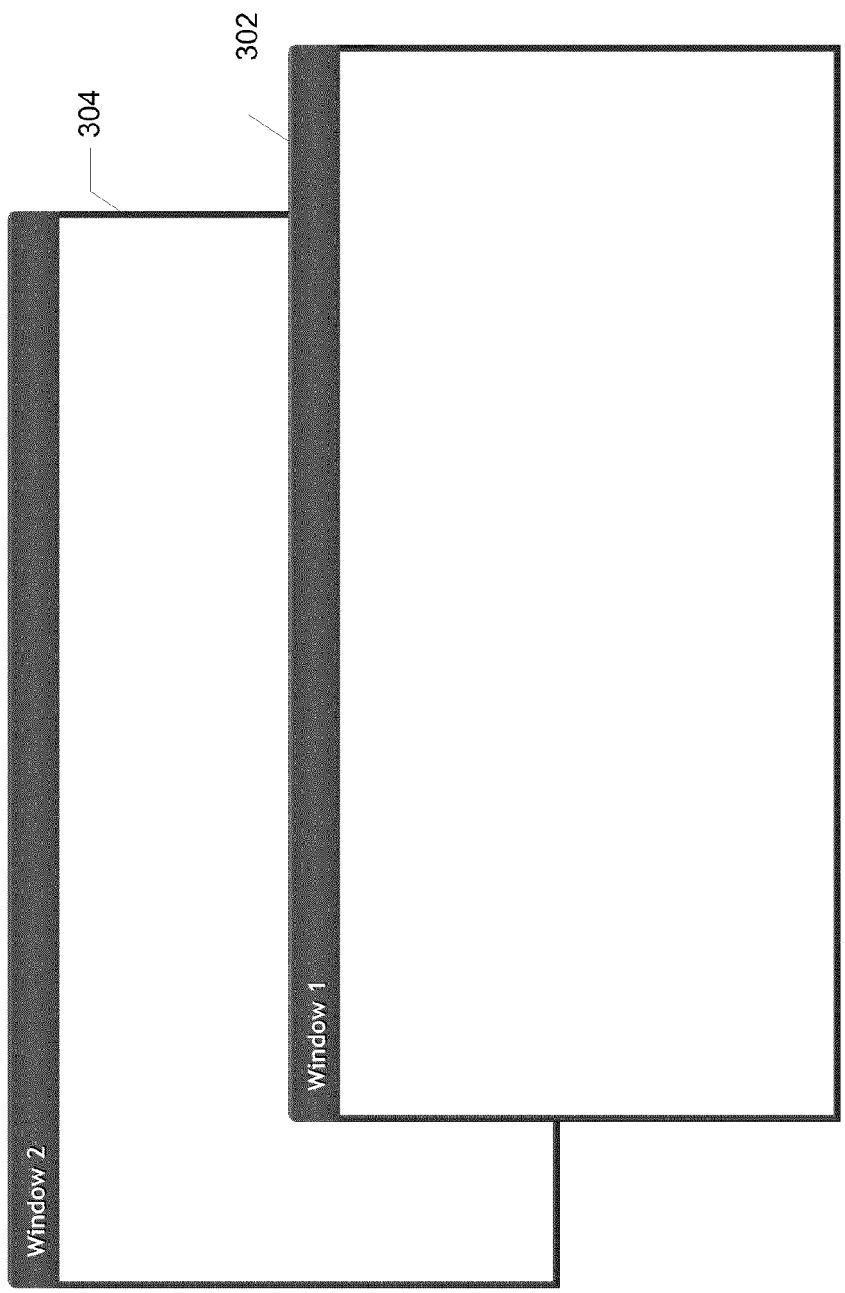
FIG. 3 is a block diagram of a display of the computer device of FIG. 1 in accordance with one embodiment of the present disclosure.

Both the network interface 130 and the router 239 can also adjust the relative priority and bandwidth assigned to each application dynamically based on which application is active. This can be better understood with reference to FIG. 3, which illustrates a display of computer device 102 in accordance with one embodiment of the present disclosure. FIG. 3 illustrates windows 302 and 304 displayed at a display of the computer device 102. Each of the windows 302 and 304 is associated with a different application. The user selects one of the windows as the active window by clicking on the window or other user input. In response to determining that the user has made window 302 the active window, the processor 105 provides an update to the application information 133 to indicate the active application. In response, the bandwidth and priority control module 131 can alter the bandwidth, priority, or both, assigned to the now-active application. For example, the bandwidth and priority control module 131 130 can increase the relative priority and bandwidth of the application associated with active window 302 and reduce the relative priority and bandwidth of the application associated with window 304. If the user subsequently selects the window 304 to be the active window, the bandwidth and priority control module 131 adjusts the relative priorities and bandwidths of the applications in response. By adjusting the priority and bandwidth based on which application is associated with the active window, the network interface 130 can improve communication efficiency for the application that is interacting with the user, improving the user experience.

Figure 4:
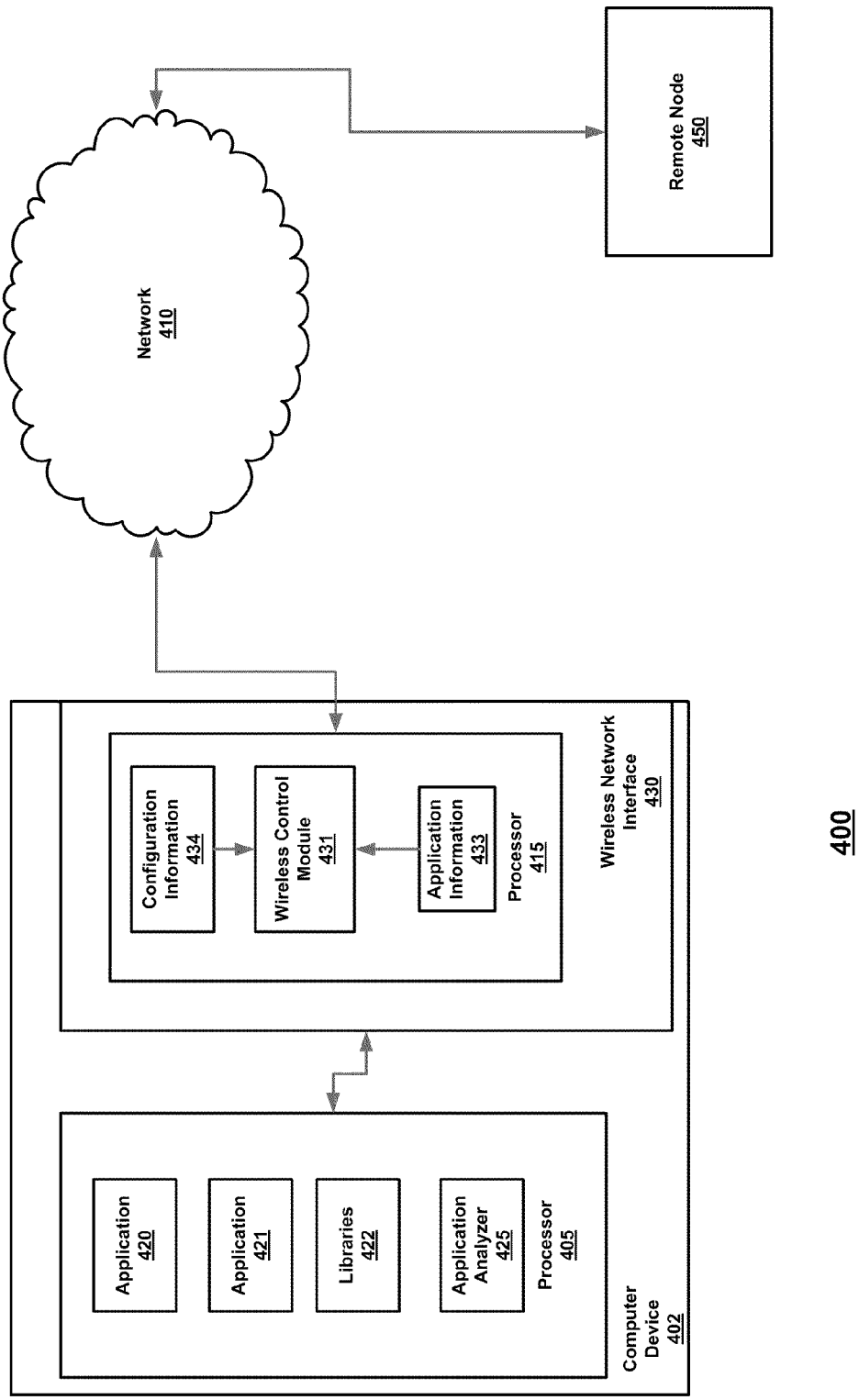
FIG. 4 is a block diagram of a communication system in accordance with one embodiment of the present disclosure.

Referring to FIG. 4, a block diagram of a communication system 400 is illustrated in accordance with one embodiment of the present disclosure. The communication system 400 includes a computer device 402, a network 410, and a remote node 450. The computer device 402 and remote node 450 are each coupled to the network 410. Computer device 402 is a desktop, laptop, server, handheld computer device, cell phone, or other device that is configured to communicate with remote nodes via the network 410. Accordingly, computer device 402 includes a processor 405 and a wireless network interface 430. Processor 405 executes applications 420 and 421, libraries 422, and application analyzer 425.

Wireless network interface 430 is a device configured to provide a wireless interface between processor 405 and the network 410. Accordingly, wireless network interface wireless network interface 430 provides a physical and logical layer interface for the processor 405. In particular, the wireless network interface 430 performs a number of functions to provide access to the network 410. For example, the wireless network interface can provide for network scanning, network acknowledgment, setting of quality of service (QOS) fields in wireless packets communicated to the network 410, network channel scanning, and the like. Network scanning refers to the wireless network interface 430 periodically scanning to determine if there are wireless access points in closer proximity to the computer device 402 than the access point currently being used, and switching communication so that access is via a closer access point. The frequency with which the wireless network interface scans for access points is referred to as network scanning frequency. Network acknowledgement refers to the wireless network interface 430 periodically determining whether the network 410 has communicated an acknowledgment to the interface, indicating the connection to the network has been maintained. For example, the wireless network interface 430 can be configured to determine, for every N packets communicated to the network 410, whether an acknowledgement has been received from the network, where N is a configurable integer value. The frequency with which the wireless network interface 430 (as indicated by the value of N) determines whether an acknowledgment has been received is referred to as network acknowledgement frequency. Network channel scanning refers to the wireless network interface 430 periodically determining whether the connection to the network 410 can be established or improved by switching to a different wireless network channel. The frequency with which the wireless network interface 430 scans the wireless network channels is referred to as network channel scanning frequency. Network scanning, channel scanning, acknowledgement, and other processes that provide for wireless access to a network are examples of wireless network parameters.

Each of the modules illustrated in FIG. 4 operates similarly to the corresponding modules of FIG. 1. Further, the network interface 430 includes a wireless control module 431 that is configured to adjust wireless network parameters based on configuration information 434 and application information 433. In particular, the wireless control module 431 compares the application information 433 to the configuration information 434 to determine the application types associated with the applications 420 and 421, and adjusts the wireless network parameters accordingly. Thus, the wireless control module 431 can adjust the network scanning frequency, the network acknowledgment frequency, the value of the QOS field of any packets communicated to the network, the channel scanning frequency, or any other network parameter based on the types of applications being executed. For example, if the wireless control module 431 determines that the applications 420 and 421 are both game applications, indicating the user is not likely to be moving around and therefore unlikely to benefit from changing wireless access points, the wireless control module 431 can reduce the network scanning frequency. This reduces the amount of communication overhead at processor 415, thereby improving communication efficiency. Similarly, channel scanning can be less desirable when the user is interacting with a game program because it is unlikely that the environment of the computer device will change. If the wireless signal strength is strong and packet loss is minimal, the wireless control module can also turn off packet acknowledgement, which can improve latency and or throughput.

Further, as applications are started or halted, changes to which applications are being executed are reflected at application information 433. The wireless control module 431 can therefore dynamically adjust the wireless network parameters as the applications being executed change, providing for more efficient communication for any particular set of executing applications.

In an embodiment, the wireless control module 431 can set the wireless network parameters on an application-by-application, or application type-by-application type, basis. Thus, for example, the wireless control module 431 can set the network acknowledgment frequency to one value for a first application (or application type) and to a second, different value for a second application (or application type). To illustrate, the wireless control module can set the network acknowledgment frequency for game type applications to check for an acknowledgment every 100 packets, and set the network acknowledgment frequency for video chat programs to every 2 packets. Thus, for packets provided by game applications and communicated to the network 410, the network interface 430 will check for acknowledgement every 100 packets. For packets provided by video chat applications and communicated to the network 410, the network interface 430 will check for acknowledgement every 2 packets. In an embodiment, the wireless control module 431 can set the acknowledgment frequency so that the network interface 430 does not check for acknowledgements at all for a designated application type.

Figure 5:
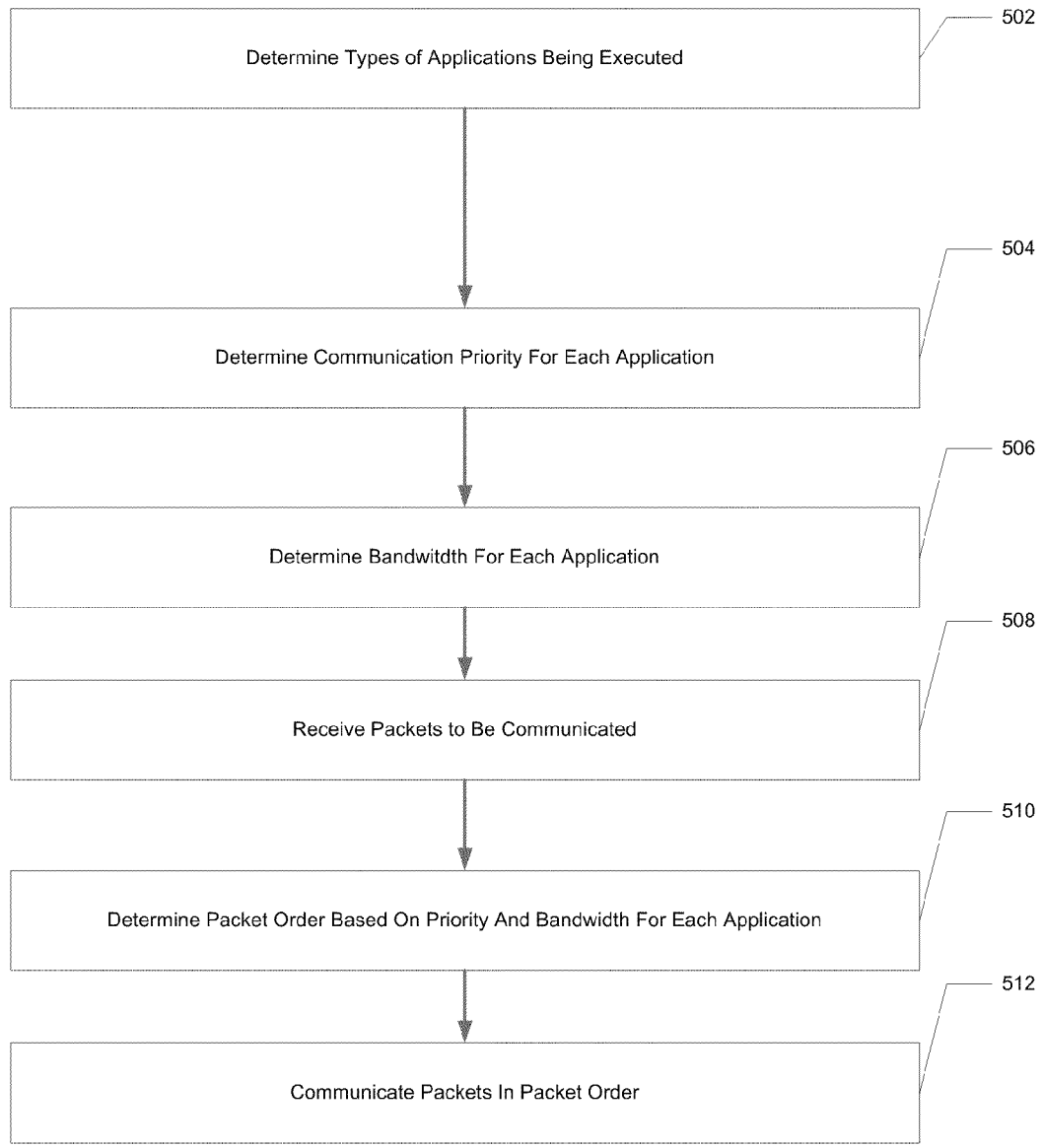
FIG. 5 is a flow diagram of a method of communicating packets to a network in accordance with one embodiment of the present disclosure.

FIG. 5 illustrates a flow diagram of a method of setting the bandwidth and priority for a set of executing applications in accordance with one embodiment of the present disclosure. At block 502, a network interface device, such as a router or network interface card, determines the types of applications being executed at a computer device. At block 504, the network interface device determines a communication priority for each application, based on the corresponding associated application type. At block 506, the network interface device determines a bandwidth for each application, based on the corresponding associated application type. At block 508, the network interface device receives a collection of bytes, with the collection including bytes provided by or targeted to each of the executing applications. At block 510, the network interface device determines an order to communicate the bytes (either to the network, for bytes to be uploaded, or to the applications, for downloaded bytes) based on the priority and bandwidth assigned to each application. At block 512, packets are created based on the bytes can communicated to the network or bytes received from the network are communicated to the bandwidth control engine.

Figure 6:
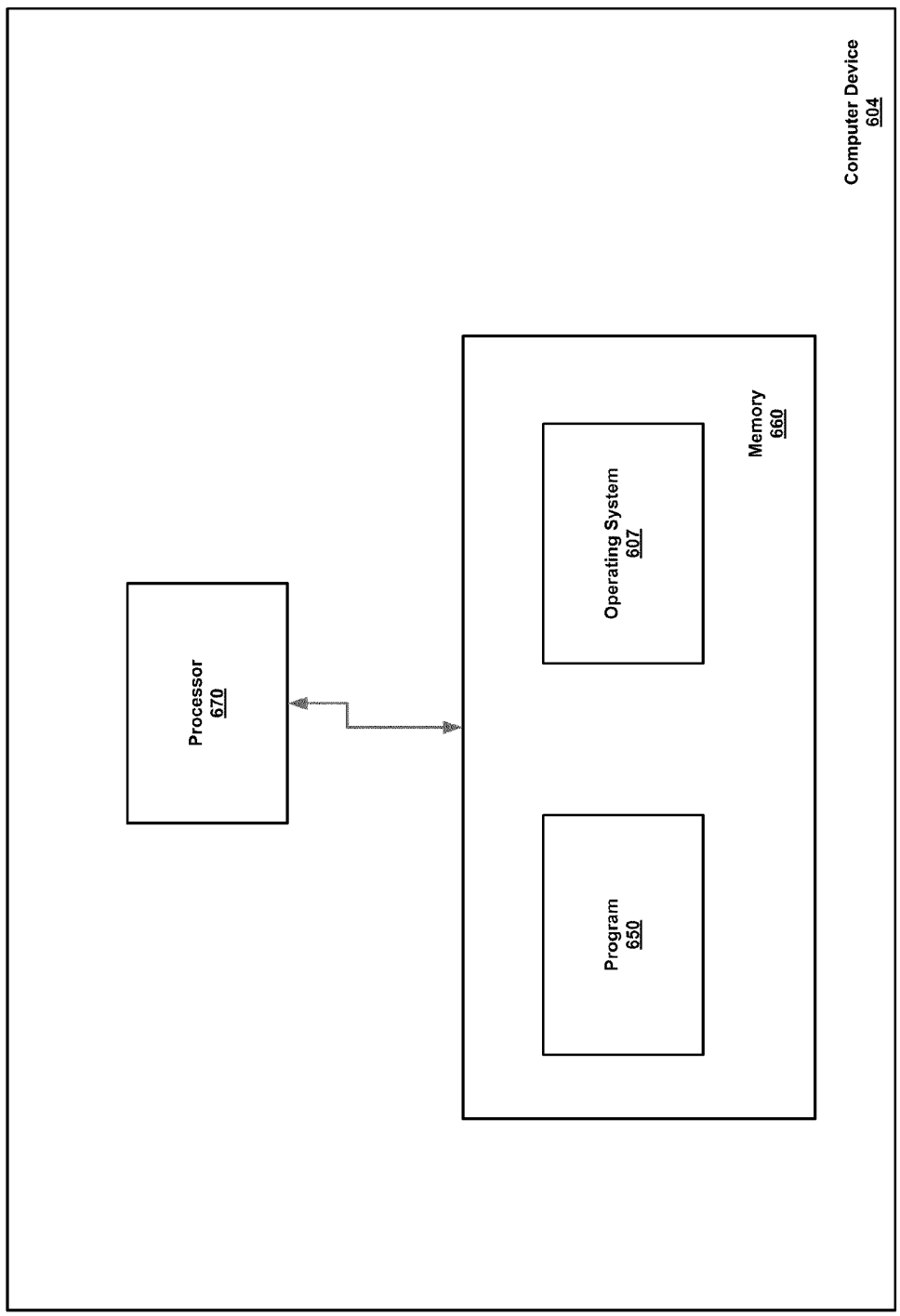
FIG. 6 is a block diagram of a computer device in accordance with one embodiment of the present disclosure.

Referring to FIG. 6, a block diagram of a particular embodiment of a computer device 604 is illustrated. The computer device 604 includes a processor 670 and a memory 660. The memory 660 is accessible to the processor 670. The processor 670 can be a microprocessor, microcontroller, and the like. The memory 660 is a computer readable medium that can be volatile memory, such as random access memory (RAM), or non-volatile memory, such as a hard disk or flash memory.

The memory 660 stores a program 650 and an operating system 607. The program 650 and the operating system 607 include instructions to manipulate the processor 670 in order to implement one or more of the methods described herein. Other programs, such as applications, can also be stored in the memory 660 to manipulate the processor in order to implement the described methods.

The above disclosed subject matter is to be considered illustrative, and not restrictive, and the appended claims are intended to cover all such modifications, enhancements, and other embodiments that fall within the true spirit and scope of the present invention. For example, other modules of the computer device 102, including the processor 105, can perform one or more functions of the network interface 130, including execution of the bandwidth and priority control module 131. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, at a network interface device positioned between a processor of a computer device and a network, first information from the processor, the first information associated with a first software application executing at the processor, wherein the first information includes at least an indication of whether a user interface window associated with the first application is an active window;
   selecting, at the network interface device, a first application type from a plurality of available application types based on the first information;
   determining, at the network interface device, network communication parameters for the first software application based upon the first application type and whether the user interface window associated with the first application is the active window; and
   regulating, at the network interface device, communication of the first application with the network in accordance with the determined network communication parameters.

2. The method of claim 1, wherein regulating communication comprises regulating communication bandwidth for the first application to a bandwidth limit, the bandwidth limit based on the first application type.

3. The method of claim 1, wherein regulating communication comprises:
   determining a priority level based on the first application type; and
   communicating a plurality of bytes to the network in a transmission order, the transmission order based on the priority level.

4. The method of claim 1, wherein regulating communication comprises:
   determining a payload size for a packet based on the first application type;
   forming the packet having the payload size; and
   communicating the packet to the network.

5. The method of claim 1, further comprising:
   receiving, from the processor of the computer device, second information associated with a second software application being executed by the processor;
   determining, at the network interface device, a second application type based on the first information; and
   regulating, at the network interface device, communication of the second application with the network based on the second application type.

6. The method of claim 5, wherein regulating communication of the first application comprises regulating communication of the first application to a first bandwidth and regulating communication of the second application comprises regulating communication of the second application to a second bandwidth, the second bandwidth different from the first bandwidth.

7. The method of claim 5, wherein regulating communication of the first application comprises determining a first priority level for the first application and regulating communication of the second application comprises determining a second priority level for the second application and communicating a plurality of packets to the network in a transmission order, the transmission order based on the first priority level and the second priority level.

8. The method of claim 1, wherein the first information associated with the first software application is one or more of a name of the first software application, software libraries accessed by the first software application, or operating system resources utilized by the first software application.

9. The method of claim 1, wherein the first information is received from the processor of the computer device with the aid of an application analyzer executed by the processor of the computer device.

10. The method of claim 1, wherein the first software application is previously unassociated with network communication parameters prior to said determining.

11. A method, comprising:
receiving, at a wireless network interface device positioned between a processor of a computer device and a wireless network, information from the processor, the information associated with a software application being executed by the processor, wherein the first information includes at least an indication of whether a user interface window associated with the first application is an active window;
determining, at the wireless network interface device, an application type based on the information;
setting, at the wireless network interface device, wireless network parameters based on the application type and whether the user interface window associated with the first application is the active window; and
configuring the wireless network interface device to communicate with the wireless network in accordance with the wireless network parameters.

12. The method of claim 11, wherein setting the wireless network parameters comprises setting a network scanning frequency based on the application type.

13. The method of claim 11, wherein setting the wireless network parameters comprises setting a network acknowledgement frequency based on the application type.

14. The method of claim 11, wherein setting the wireless network parameters comprises forming a plurality of packets having a quality-of-service (QOS) field, storing a value based on the application type at the QOS field, and communicating the plurality of packets to the wireless network.

15. The method of claim 11, wherein setting the wireless network parameters comprises setting a frequency at which a network interface scans for available wireless channels.

16. The method of claim 11, wherein setting the wireless network parameters comprises setting a frequency at which a network interface scans for available wireless access points.

17. The method of claim 11, wherein setting the wireless network parameters comprises setting a backoff time associated with communicating with the wireless network.

18. The method of claim 11, wherein setting the wireless network parameters comprises setting a first network acknowledgement frequency for a first application and a second network acknowledgement frequency for a second application, the first network acknowledgement frequency different than the second network acknowledgement frequency.

19. The method of claim 18, wherein setting the first network acknowledgment frequency comprises setting a parameter so that no acknowledgement from the network is determined for information communicated by the first application.

20. A network interface device, comprising:
a first port coupled to a processor device of a computer device;
a second port coupled to a network; and
a control module configured to
receive, from the processor device of the computer device, first information associated with a first application executing at the processor device, wherein the first information includes at least an indication of whether a user interface window associated with the first application is an active window,
select a first application type for the first application based upon the first information,
determine network communication parameters for the first software application based upon the first application type and whether the user interface window associated with the first application is the active window, and
regulate communication of the first application with the network in accordance with the determined network communication parameters.

21. The network interface device of claim 20, wherein the control module is configured to regulate communication by setting a bandwidth limit for the first application based on the first application type.

22. The network interface device of claim 20, wherein the control module is configured to regulate communication by:
determining a priority level based on the first application type; and
communicating a plurality of bytes to the network in a transmission order, the transmission order based on the priority level.

23. The network interface device of claim 20, wherein the control module is configured to regulate communication by:
determining a payload size for a packet based on the first application type;
forming the packet having the payload size; and
communicating the packet to the network.

* * * * *